US008630947B1

(12) United States Patent
Freund

(10) Patent No.: US 8,630,947 B1
(45) Date of Patent: Jan. 14, 2014

(54) METHOD AND SYSTEM FOR PROVIDING ELECTRONIC BILL PAYMENT AND PRESENTMENT

(75) Inventor: Peter C. Freund, New York, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 2036 days.

(21) Appl. No.: 10/814,626

(22) Filed: Apr. 1, 2004

Related U.S. Application Data

(60) Provisional application No. 60/460,054, filed on Apr. 4, 2003.

(51) Int. Cl.
*G06Q 40/00* (2012.01)

(52) U.S. Cl.
USPC .......................................................... 705/40

(58) Field of Classification Search
USPC ..................................................... 705/37, 40
See application file for complete search history.

(56) References Cited

U.S. PATENT DOCUMENTS

| | | |
|---|---|---|
| 3,653,480 A | 4/1972 | Yamamoto et al. |
| 4,050,375 A | 9/1977 | Orlans |
| 4,141,078 A | 2/1979 | Bridges et al. |
| 4,205,780 A | 6/1980 | Burns et al. |
| 4,264,808 A | 4/1981 | Owens et al. |
| 4,321,672 A | 3/1982 | Braun et al. |
| 4,396,985 A | 8/1983 | Ohara |
| RE31,692 E | 10/1984 | Tyburski et al. |
| 4,495,018 A | 1/1985 | Vohrer |
| 4,617,457 A | 10/1986 | Myers |
| 4,672,377 A | 6/1987 | Murphy |
| 4,694,397 A | 9/1987 | Grant et al. |
| 4,700,055 A | 10/1987 | Kashkashian, Jr. |
| 4,713,761 A | 12/1987 | Sharpe et al. |

(Continued)

FOREIGN PATENT DOCUMENTS

| | | |
|---|---|---|
| EP | 421808 | 4/1991 |
| EP | 1014318 | 6/2000 |

(Continued)

OTHER PUBLICATIONS

Visa & Carnegie Mellon Plan Online Payment Scheme, Newsbyte News Network, Feb. 15, 1995, 2 pages.

(Continued)

*Primary Examiner* — Lindsay M Maguire
(74) *Attorney, Agent, or Firm* — Hunton & Williams LLP

(57) ABSTRACT

An embodiment of the present invention relates to capturing payer information and biller information for generating menu delivered to a customer to activate the billers for electronic payment and/or electronic presentment by selecting one or more billers. A method for facilitating electronic payment related services to at least one payer entity for making payments to at least one biller may comprise the steps of collecting payer information associated with the at least one payer entity; collecting billing information associated with the at least one payer entity; identifying one or more billers associated with the at least one payer entity from the payer information and the billing information, where the at least one payer entity has a relationship with each of the one or more billers; generating a menu for the at least one payer entity to select one or more billers for activating one or more electronic payment related services; and activating the one or more electronic payment related services in response to the at least one payer entity's selection of the one or more billers.

34 Claims, 5 Drawing Sheets

(56) References Cited

U.S. PATENT DOCUMENTS

| | | | |
|---|---|---|---|
| 4,752,877 | A | 6/1988 | Roberts et al. |
| 4,797,913 | A | 1/1989 | Kaplan |
| 4,799,156 | A | 1/1989 | Shavit |
| 4,807,177 | A | 2/1989 | Ward |
| 4,812,628 | A | 3/1989 | Boston et al. |
| 4,823,264 | A | 4/1989 | Deming |
| 4,893,333 | A | 1/1990 | Baran et al. |
| 4,931,793 | A | 6/1990 | Fuhrmann et al. |
| 4,939,674 | A | 7/1990 | Price et al. |
| 4,948,174 | A | 8/1990 | Thomson et al. |
| 4,974,878 | A | 12/1990 | Josephson |
| 4,975,841 | A | 12/1990 | Kehnemuyi et al. |
| 4,988,849 | A | 1/1991 | Sasaki |
| 4,992,646 | A | 2/1991 | Collin |
| 4,992,940 | A | 2/1991 | Dworkin |
| 5,023,904 | A | 6/1991 | Kaplan |
| 5,053,607 | A | 10/1991 | Carlson |
| 5,054,096 | A | 10/1991 | Beizer |
| 5,080,748 | A | 1/1992 | Bonomi |
| 5,111,395 | A | 5/1992 | Smith |
| 5,121,945 | A | 6/1992 | Thomson et al. |
| 5,122,950 | A | 6/1992 | Mee |
| 5,136,502 | A | 8/1992 | Van Remortel et al. |
| 5,175,682 | A | 12/1992 | Higashiyama |
| 5,187,750 | A | 2/1993 | Behera |
| 5,198,975 | A | 3/1993 | Baker et al. |
| 5,220,501 | A | 6/1993 | Lawlor |
| 5,225,978 | A | 7/1993 | Peterson |
| 5,237,159 | A | 8/1993 | Stephens |
| 5,265,007 | A | 11/1993 | Barnhard, Jr. et al. |
| 5,283,829 | A | 2/1994 | Anderson |
| 5,287,269 | A | 2/1994 | Dorrough et al. |
| 5,311,594 | A | 5/1994 | Penzias |
| 5,315,508 | A | 5/1994 | Bain et al. |
| 5,321,238 | A | 6/1994 | Watanabe |
| 5,326,959 | A | 7/1994 | Perazza |
| 5,336,870 | A | 8/1994 | Hughes |
| 5,349,170 | A | 9/1994 | Kern |
| 5,350,906 | A | 9/1994 | Brody et al. |
| 5,367,581 | A | 11/1994 | VanHorn |
| 5,373,550 | A | 12/1994 | Campbell |
| 5,396,417 | A | 3/1995 | Burks et al. |
| 5,402,474 | A | 3/1995 | Miller |
| 5,412,190 | A | 5/1995 | Kopesec |
| 5,424,938 | A | 6/1995 | Wagner |
| 5,430,644 | A | 7/1995 | Deaton et al. |
| 5,432,506 | A | 7/1995 | Chapman |
| 5,444,794 | A | 8/1995 | Uhland |
| 5,444,841 | A | 8/1995 | Glasser et al. |
| 5,446,740 | A | 8/1995 | Yien |
| 5,448,471 | A | 9/1995 | Deaton et al. |
| 5,459,482 | A | 10/1995 | Orlen |
| 5,465,206 | A | 11/1995 | Hilt et al. |
| 5,477,040 | A | 12/1995 | Lalonde |
| 5,479,494 | A | 12/1995 | Clitherow |
| 5,483,445 | A | 1/1996 | Pickering |
| 5,484,988 | A | 1/1996 | Hills |
| 5,502,576 | A | 3/1996 | Ramsay et al. |
| 5,504,677 | A | 4/1996 | Pollin |
| 5,506,691 | A | 4/1996 | Bednar et al. |
| 5,508,731 | A | 4/1996 | Kohorn |
| 5,513,250 | A | 4/1996 | McAllister |
| 5,532,464 | A | 7/1996 | Josephson et al. |
| 5,544,043 | A | 8/1996 | Miki et al. |
| 5,544,046 | A | 8/1996 | Niwa |
| 5,550,734 | A | 8/1996 | Tater |
| 5,551,021 | A | 8/1996 | Harada |
| 5,557,515 | A | 9/1996 | Abbruzzese et al. |
| 5,563,400 | A | 10/1996 | Le Roux |
| 5,566,330 | A | 10/1996 | Sheffield |
| 5,568,489 | A | 10/1996 | Yien |
| 5,570,465 | A | 10/1996 | Tsakanikas |
| 5,572,004 | A | 11/1996 | Raimann |
| 5,583,759 | A | 12/1996 | Geer |
| 5,583,760 | A | 12/1996 | Klesse |
| 5,590,196 | A | 12/1996 | Moreau |
| 5,590,197 | A | 12/1996 | Chen |
| 5,592,377 | A | 1/1997 | Lipkin |
| 5,592,378 | A | 1/1997 | Cameron |
| 5,599,528 | A | 2/1997 | Igaki |
| 5,603,025 | A | 2/1997 | Tabb |
| 5,615,109 | A | 3/1997 | Eder |
| 5,621,201 | A | 4/1997 | Langhans |
| 5,640,577 | A | 6/1997 | Scharmer |
| 5,642,419 | A | 6/1997 | Rosen |
| 5,649,117 | A | 7/1997 | Landry |
| 5,652,786 | A | 7/1997 | Rogers |
| 5,659,165 | A | 8/1997 | Jennings |
| 5,659,469 | A | 8/1997 | Deaton et al. |
| 5,659,741 | A | 8/1997 | Eberhardt |
| 5,666,493 | A | 9/1997 | Wojcik et al. |
| 5,677,955 | A | 10/1997 | Doggett et al. |
| 5,679,938 | A | 10/1997 | Templeton |
| 5,679,940 | A | 10/1997 | Templeton |
| 5,687,250 | A | 11/1997 | Curley et al. |
| 5,692,132 | A | 11/1997 | Hogan |
| 5,699,528 | A * | 12/1997 | Hogan ............................ 705/40 |
| 5,703,344 | A | 12/1997 | Bezy et al. |
| 5,704,044 | A | 12/1997 | Tarter et al. |
| 5,708,422 | A | 1/1998 | Blonder et al. |
| 5,715,298 | A | 2/1998 | Rogers |
| 5,715,314 | A | 2/1998 | Payne |
| 5,715,399 | A | 2/1998 | Bezos |
| 5,717,989 | A | 2/1998 | Tozzoli et al. |
| 5,724,424 | A | 3/1998 | Gifford |
| 5,727,249 | A | 3/1998 | Pollin |
| 5,748,780 | A | 5/1998 | Stolfo |
| 5,751,842 | A | 5/1998 | Eccles |
| 5,757,917 | A | 5/1998 | Rose et al. |
| 5,770,843 | A | 6/1998 | Rose et al. |
| 5,774,553 | A | 6/1998 | Rosen |
| 5,783,808 | A | 7/1998 | Josephson |
| 5,784,696 | A | 7/1998 | Melnikof |
| 5,793,861 | A | 8/1998 | Haigh |
| 5,794,221 | A | 8/1998 | Egendorf |
| 5,802,498 | A | 9/1998 | Comesanas |
| 5,802,499 | A | 9/1998 | Sampson et al. |
| 5,819,236 | A | 10/1998 | Josephson |
| 5,819,238 | A | 10/1998 | Fernholz |
| 5,826,241 | A | 10/1998 | Stein |
| 5,826,245 | A | 10/1998 | Sandberg-Diment |
| 5,832,447 | A | 11/1998 | Rieker |
| 5,832,460 | A | 11/1998 | Bednar |
| 5,832,464 | A | 11/1998 | Houvener et al. |
| 5,832,488 | A | 11/1998 | Eberhardt |
| 5,835,580 | A | 11/1998 | Fraser |
| 5,835,603 | A | 11/1998 | Coutts |
| 5,835,899 | A | 11/1998 | Rose et al. |
| 5,852,812 | A | 12/1998 | Reeder |
| 5,859,419 | A | 1/1999 | Wynn |
| 5,864,609 | A | 1/1999 | Cross et al. |
| 5,870,456 | A | 2/1999 | Rogers |
| 5,870,721 | A | 2/1999 | Norris |
| 5,870,723 | A | 2/1999 | Pare |
| 5,870,725 | A | 2/1999 | Bellinger et al. |
| 5,873,072 | A | 2/1999 | Kight |
| 5,878,141 | A | 3/1999 | Daly et al. |
| 5,883,810 | A | 3/1999 | Franklin et al. |
| 5,884,288 | A | 3/1999 | Chang |
| 5,884,290 | A | 3/1999 | Smorodinsky et al. |
| 5,897,625 | A | 4/1999 | Gustin |
| 5,898,157 | A | 4/1999 | Mangili et al. |
| 5,903,881 | A | 5/1999 | Schrader |
| 5,910,896 | A | 6/1999 | Hahn-Carlson |
| 5,910,988 | A | 6/1999 | Ballard |
| 5,915,246 | A | 6/1999 | Patterson et al. |
| 5,917,965 | A | 6/1999 | Cahill et al. |
| 5,920,847 | A | 7/1999 | Kolling et al. |
| 5,930,778 | A | 7/1999 | Geer |
| 5,940,811 | A | 8/1999 | Norris |
| 5,940,844 | A | 8/1999 | Cahill et al. |
| 5,943,656 | A | 8/1999 | Crooks |
| 5,945,653 | A | 8/1999 | Walker et al. |
| 5,956,700 | A | 9/1999 | Landry |

(56) References Cited

U.S. PATENT DOCUMENTS

| | | |
|---|---|---|
| 5,963,659 A | 10/1999 | Cahill et al. |
| 5,963,925 A | 10/1999 | Kolling et al. |
| 5,966,698 A | 10/1999 | Pollin |
| 5,978,780 A | 11/1999 | Watson |
| 5,987,435 A | 11/1999 | Weiss et al. |
| 5,987,436 A | 11/1999 | Halbrook |
| 5,987,439 A | 11/1999 | Gustin et al. |
| 5,991,750 A | 11/1999 | Watson |
| 6,000,832 A | 12/1999 | Franklin et al. |
| 6,003,762 A | 12/1999 | Hayashida |
| 6,006,208 A | 12/1999 | Forst et al. |
| 6,009,442 A | 12/1999 | Chen et al. |
| 6,014,636 A | 1/2000 | Reeder |
| 6,016,482 A | 1/2000 | Molinari et al. |
| 6,016,484 A | 1/2000 | Williams et al. |
| 6,018,718 A | 1/2000 | Walker et al. |
| 6,026,388 A | 2/2000 | Liddy et al. |
| 6,029,139 A | 2/2000 | Cunningham et al. |
| 6,032,133 A | 2/2000 | Hilt et al. |
| 6,032,137 A | 2/2000 | Hallard |
| 6,035,281 A | 3/2000 | Crosskey et al. |
| 6,035,285 A | 3/2000 | Schlect et al. |
| 6,035,287 A | 3/2000 | Stallaert et al. |
| 6,038,553 A | 3/2000 | Hyde, Jr. |
| 6,041,312 A | 3/2000 | Bickerton et al. |
| 6,041,315 A | 3/2000 | Pollin |
| 6,044,362 A | 3/2000 | Neely |
| 6,045,039 A | 4/2000 | Stinson et al. |
| 6,047,261 A | 4/2000 | Siefert |
| 6,052,674 A | 4/2000 | Zervides et al. |
| 6,058,380 A | 5/2000 | Anderson et al. |
| 6,058,381 A | 5/2000 | Nelson |
| 6,061,665 A | 5/2000 | Bahreman |
| 6,064,764 A | 5/2000 | Bhaskaran et al. |
| 6,064,987 A | 5/2000 | Walker et al. |
| 6,065,675 A | 5/2000 | Teicher |
| 6,067,524 A | 5/2000 | Byerly et al. |
| 6,070,150 A | 5/2000 | Remington et al. |
| 6,070,798 A | 6/2000 | Nethery |
| 6,073,104 A | 6/2000 | Field |
| 6,073,113 A | 6/2000 | Guinan |
| 6,076,072 A | 6/2000 | Libman |
| 6,078,907 A | 6/2000 | Lamm |
| 6,081,790 A | 6/2000 | Rosen |
| 6,085,168 A | 7/2000 | Mori et al. |
| 6,088,683 A | 7/2000 | Jalili |
| 6,088,685 A | 7/2000 | Kiron et al. |
| 6,088,686 A | 7/2000 | Walker et al. |
| 6,092,056 A | 7/2000 | Tull, Jr. et al. |
| 6,098,053 A | 8/2000 | Slater |
| 6,098,070 A | 8/2000 | Maxwell |
| 6,105,011 A | 8/2000 | Morrison, Jr. |
| 6,108,639 A | 8/2000 | Walker et al. |
| 6,110,044 A | 8/2000 | Stern |
| 6,111,858 A | 8/2000 | Greaves et al. |
| 6,115,690 A | 9/2000 | Wong |
| 6,119,106 A | 9/2000 | Mersky et al. |
| 6,119,107 A | 9/2000 | Polk |
| 6,125,354 A | 9/2000 | MacFarlane et al. |
| 6,128,602 A | 10/2000 | Northington et al. |
| 6,128,603 A * | 10/2000 | Dent et al. ..................... 705/40 |
| 6,129,273 A | 10/2000 | Shah |
| 6,138,118 A | 10/2000 | Koppstein et al. |
| 6,144,946 A | 11/2000 | Iwamura |
| 6,148,293 A | 11/2000 | King |
| 6,149,055 A | 11/2000 | Gatto |
| 6,149,056 A | 11/2000 | Stinson et al. |
| 6,173,272 B1 | 1/2001 | Thomas et al. |
| 6,181,837 B1 | 1/2001 | Cahill et al. |
| 6,185,544 B1 | 2/2001 | Sakamoto et al. |
| 6,202,054 B1 | 3/2001 | Lawlor et al. |
| 6,205,433 B1 | 3/2001 | Boesch et al. |
| 6,213,391 B1 | 4/2001 | Lewis |
| 6,227,447 B1 | 5/2001 | Campisano |
| 6,233,565 B1 | 5/2001 | Lewis et al. |
| 6,233,566 B1 | 5/2001 | Levine et al. |
| 6,236,972 B1 | 5/2001 | Shkedy |
| 6,240,444 B1 | 5/2001 | Fin et al. |
| 6,278,981 B1 | 8/2001 | Dembo et al. |
| 6,289,322 B1 | 9/2001 | Kitchen et al. |
| 6,292,789 B1 | 9/2001 | Schutzer |
| 6,301,379 B1 | 10/2001 | Thompson et al. |
| 6,301,567 B1 * | 10/2001 | Leong et al. ..................... 705/33 |
| 6,304,858 B1 | 10/2001 | Mosler et al. |
| 6,321,212 B1 | 11/2001 | Lange |
| 6,324,524 B1 | 11/2001 | Lent et al. |
| 6,338,047 B1 | 1/2002 | Wallman |
| 6,338,049 B1 | 1/2002 | Walker et al. |
| 6,343,279 B1 | 1/2002 | Bissonette et al. |
| 6,363,164 B1 | 3/2002 | Jones et al. |
| 6,363,364 B1 | 3/2002 | Nel |
| 6,363,365 B1 | 3/2002 | Kou |
| 6,366,967 B1 | 4/2002 | Wagner |
| 6,374,235 B1 | 4/2002 | Chen et al. |
| 6,390,362 B1 | 5/2002 | Martin |
| 6,393,409 B2 | 5/2002 | Young et al. |
| 6,405,173 B1 | 6/2002 | Honarvar et al. |
| 6,415,259 B1 | 7/2002 | Wolfinger et al. |
| 6,418,419 B1 | 7/2002 | Nieboer et al. |
| 6,418,420 B1 | 7/2002 | DiGiorgio et al. |
| 6,418,430 B1 | 7/2002 | DeFazio et al. |
| 6,434,159 B1 | 8/2002 | Woodward et al. |
| 6,446,072 B1 | 9/2002 | Schulze et al. |
| 6,460,020 B1 | 10/2002 | Pool et al. |
| 6,490,568 B1 | 12/2002 | Omara et al. |
| 6,493,685 B1 | 12/2002 | Ensel et al. |
| 6,535,896 B2 | 3/2003 | Britton et al. |
| 6,536,663 B1 | 3/2003 | Lozier et al. |
| 6,554,185 B1 | 4/2003 | Montross et al. |
| 6,574,350 B1 | 6/2003 | Rhoads et al. |
| 6,574,377 B1 | 6/2003 | Cahill et al. |
| 6,578,000 B1 | 6/2003 | Dodrill et al. |
| 6,578,015 B1 | 6/2003 | Haseltine et al. |
| 6,609,113 B1 | 8/2003 | O'Leary et al. |
| 6,609,125 B1 | 8/2003 | Layne et al. |
| 6,629,081 B1 | 9/2003 | Cornelius et al. |
| 6,636,615 B1 | 10/2003 | Rhoads et al. |
| 6,658,393 B1 | 12/2003 | Basch et al. |
| 6,661,910 B2 | 12/2003 | Jones et al. |
| 6,704,714 B1 | 3/2004 | O'Leary et al. |
| 6,721,715 B2 | 4/2004 | Nemzow |
| 6,728,397 B2 | 4/2004 | McNeal |
| 6,820,058 B2 | 11/2004 | Wood et al. |
| 6,825,940 B1 | 11/2004 | Wu et al. |
| 6,860,375 B2 | 3/2005 | Hallowell et al. |
| 6,954,896 B1 | 10/2005 | Dodrill et al. |
| 6,965,882 B1 | 11/2005 | Lapstun et al. |
| 6,970,259 B1 | 11/2005 | Lunt et al. |
| 6,970,855 B2 | 11/2005 | Das et al. |
| RE38,957 E | 1/2006 | Laussermair et al. |
| 7,004,382 B2 | 2/2006 | Sandru |
| 7,062,456 B1 | 6/2006 | Riehl et al. |
| 7,068,832 B1 | 6/2006 | Price et al. |
| 7,104,443 B1 | 9/2006 | Paul et al. |
| 7,133,846 B1 | 11/2006 | Ginter et al. |
| 7,177,836 B1 | 2/2007 | German et al. |
| 7,200,255 B2 | 4/2007 | Jones et al. |
| 7,313,543 B1 | 12/2007 | Crane et al. |
| 7,317,823 B1 | 1/2008 | Price et al. |
| 7,337,148 B2 | 2/2008 | Xie et al. |
| 7,349,884 B1 | 3/2008 | Odom |
| 7,380,707 B1 | 6/2008 | Fredman |
| 7,401,048 B2 | 7/2008 | Rosedale et al. |
| 2001/0011222 A1 | 8/2001 | McLauchlin et al. |
| 2001/0018666 A1 | 8/2001 | Sugiyama et al. |
| 2001/0018739 A1 | 8/2001 | Anderson et al. |
| 2001/0032139 A1 | 10/2001 | Debonnet, Jr. |
| 2001/0037300 A1 | 11/2001 | Miyazaki et al. |
| 2001/0037309 A1 | 11/2001 | Vrain |
| 2001/0047334 A1 | 11/2001 | Nappe et al. |
| 2001/0047489 A1 | 11/2001 | Ito et al. |
| 2001/0051533 A1 | 12/2001 | Wietzke et al. |
| 2002/0012445 A1 | 1/2002 | Perry |
| 2002/0013728 A1 | 1/2002 | Wilkman |

(56) References Cited

U.S. PATENT DOCUMENTS

| | | | |
|---|---|---|---|
| 2002/0013768 A1* | 1/2002 | Ganesan | 705/40 |
| 2002/0023055 A1 | 2/2002 | Antognini et al. | |
| 2002/0026394 A1 | 2/2002 | Savage et al. | |
| 2002/0038363 A1 | 3/2002 | MacLean | |
| 2002/0046169 A1 | 4/2002 | Keresman, III et al. | |
| 2002/0052842 A1 | 5/2002 | Schuba et al. | |
| 2002/0055907 A1 | 5/2002 | Pater et al. | |
| 2002/0069134 A1 | 6/2002 | Solomon | |
| 2002/0072976 A1 | 6/2002 | Virtanen et al. | |
| 2002/0077978 A1 | 6/2002 | O'Leary et al. | |
| 2002/0082985 A1 | 6/2002 | MacKay | |
| 2002/0087415 A1 | 7/2002 | Allen et al. | |
| 2002/0087468 A1 | 7/2002 | Ganesan et al. | |
| 2002/0087469 A1 | 7/2002 | Ganesan et al. | |
| 2002/0091635 A1 | 7/2002 | Dilip et al. | |
| 2002/0100803 A1 | 8/2002 | Sehr | |
| 2002/0107770 A1 | 8/2002 | Meyer et al. | |
| 2002/0107788 A1 | 8/2002 | Cunningham | |
| 2002/0111837 A1 | 8/2002 | Aupperle | |
| 2002/0128981 A1 | 9/2002 | Kawan et al. | |
| 2002/0138398 A1 | 9/2002 | Kalin et al. | |
| 2002/0169658 A1 | 11/2002 | Adler | |
| 2002/0170966 A1 | 11/2002 | Hannigan et al. | |
| 2002/0178071 A1 | 11/2002 | Walker et al. | |
| 2002/0184151 A1 | 12/2002 | Maloney | |
| 2002/0194096 A1 | 12/2002 | Falcone et al. | |
| 2002/0198817 A1 | 12/2002 | Dhir | |
| 2002/0199182 A1 | 12/2002 | Whitehead | |
| 2003/0018557 A1 | 1/2003 | Gilbert et al. | |
| 2003/0037002 A1 | 2/2003 | Higgins et al. | |
| 2003/0040959 A1 | 2/2003 | Fei et al. | |
| 2003/0046218 A1 | 3/2003 | Albanese et al. | |
| 2003/0055675 A1 | 3/2003 | Klein Twennaar | |
| 2003/0069780 A1 | 4/2003 | Hailwood et al. | |
| 2003/0097335 A1 | 5/2003 | Muskowitz et al. | |
| 2003/0105641 A1 | 6/2003 | Lewis | |
| 2003/0110442 A1 | 6/2003 | Battle | |
| 2003/0120686 A1 | 6/2003 | Kim et al. | |
| 2003/0130945 A1 | 7/2003 | Force et al. | |
| 2003/0130952 A1 | 7/2003 | Bell et al. | |
| 2003/0144942 A1 | 7/2003 | Sobek | |
| 2003/0187789 A1 | 10/2003 | Karas et al. | |
| 2003/0191710 A1 | 10/2003 | Green et al. | |
| 2003/0200107 A1 | 10/2003 | Allen et al. | |
| 2003/0208421 A1 | 11/2003 | Vicknair et al. | |
| 2003/0208441 A1 | 11/2003 | Poplawski et al. | |
| 2003/0225663 A1 | 12/2003 | Horan et al. | |
| 2003/0233305 A1 | 12/2003 | Solomon | |
| 2003/0237046 A1 | 12/2003 | Parker et al. | |
| 2004/0064409 A1 | 4/2004 | Kight et al. | |
| 2004/0078328 A1 | 4/2004 | Talbert et al. | |
| 2004/0133516 A1 | 7/2004 | Buchanan et al. | |
| 2004/0201735 A1 | 10/2004 | Baron | |
| 2004/0228514 A1 | 11/2004 | Houle et al. | |
| 2005/0033690 A1 | 2/2005 | Antognini et al. | |
| 2005/0055254 A1 | 3/2005 | Schmidtberg et al. | |
| 2005/0086178 A1 | 4/2005 | Xie et al. | |
| 2005/0091156 A1 | 4/2005 | Hailwood et al. | |
| 2005/0097050 A1 | 5/2005 | Orcutt | |
| 2005/0144059 A1 | 6/2005 | Schuessler | |
| 2005/0177480 A1 | 8/2005 | Huang | |
| 2005/0209954 A1 | 9/2005 | Asher et al. | |
| 2005/0261955 A1 | 11/2005 | Humble et al. | |
| 2006/0106650 A1 | 5/2006 | Bush | |
| 2006/0106717 A1 | 5/2006 | Randle et al. | |
| 2006/0136335 A1 | 6/2006 | Ferguson, III | |
| 2006/0178986 A1 | 8/2006 | Giordano et al. | |
| 2006/0206427 A1 | 9/2006 | Love et al. | |
| 2006/0282389 A1 | 12/2006 | Gupte | |
| 2006/0287953 A1 | 12/2006 | Chauhan | |
| 2008/0193008 A1 | 8/2008 | Mount et al. | |

FOREIGN PATENT DOCUMENTS

| | | |
|---|---|---|
| WO | WO 91/16691 | 10/1991 |
| WO | WO 93/08545 | 4/1993 |
| WO | WO 94/28497 | 12/1994 |
| WO | WO 96/08783 | 3/1996 |
| WO | WO 96/12242 A1 | 4/1996 |
| WO | WO 97/14108 | 4/1997 |
| WO | WO 97/45796 | 12/1997 |
| WO | WO 97/45814 | 12/1997 |
| WO | WO 98/09260 | 3/1998 |
| WO | WO 99/10823 | 3/1999 |
| WO | WO 00/39979 | 7/2000 |
| WO | WO 01/75730 A2 | 10/2001 |
| WO | WO 02/063432 A2 | 8/2002 |
| WO | WO 2004/079603 | 9/2004 |

OTHER PUBLICATIONS

Priya, Malhotra, "Clearing House Enumerates e-Payments Ills," American Banker The Financial Services Daily, Tuesday, Aug. 13, 2002, 2 pages.

Financial News, "Wells Fargo Rolls Out Lockbox Check Conversion," PR Newswire, Apr. 22, 2003, 2 pages.

Hunt, Robert M., An Introduction to the Economics of Payment Card Networks.

Annual Report Pursuant to Sectin 13 or 15(d) of The Securities Exchange Act of 1934, Form 10-K, Intelidata Technologies Corporation, Fiscal Year Ended Dec. 31, 2001.

Blockbuster running test of a stored value card, The American Banker, Sep. 1, 1995.

CES/NaBANCO introduces stored value card technology blockbuster video is first merchant partner, Business Wire, Inc., Jan. 15, 1996.

Card Flash Daily Payment Card News, www.cardweb.com, printed Sep. 23, 2004.

Anonymous, Chase Manhattan introduces new FEDI payables product, ProQuest document ID: 7806951, ISSN/ISBN: 02686635, May 1995.

Bills, Chase Pact Done, What's Next for Web Vendors?, The American Banker, Technology Section, Jun. 3, 2002, p. 23.

Reinbach, Chase steps up treasury system, ProQuest documednt ID 8723558, ISSN/ISBN: 10459472, Nov. 1995.

Anonymous, Chasing the global trend, Cash Management News, proQuest document ID 9319923, ISSN/ISBN: 02686635, Dec. 1995.

Malhotra, Clearing House Enumerates e-Payments Ills, The American Banker, vol. 167, No. 154, Aug. 23, 2002.

Marjanovic, Corporate Services: Chase Gears Up Global Payments System Series: 16, The American Banker, vol. 160, Issue 174, Sep. 11, 1995, p. 41.

Gluck, Creating a Global Cash-Management Game Plan, Bank Systems & Technology, Feb. 1997, p. 28.

Lamond, Credit Card Transactions Real World and Online, Paying by Credit Card—Real World and Online, http://www.virtualschool.edu/mon/ElectronicProperty/klamond/credit, printed Jul. 8, 2005, 17 pages.

Lamond, Keith, Credit Card Transactions Real World and Online, http://www.virtualschool.edu/mon/ElectronicProperty/klamond/credit_card.htm, pp. 1-17, printed Jul. 8, 2005.

Dialog file 20, #10279554; Offer: Book Yourself Free Cassettes; Mar. 25, 2000; Birmingham Post, p. 16.

Du Pont's Electronic Payments, Corporate EFT Report, v9, n1, Dialog file 636, Accession No. 01066902, Jan. 11, 1989.

Carreker, Electronic check presentment: Capturing new technology, http://proquest.umi.com, Banking Management, Rolling Meadows: vol. 71, Issue 2, Mar./Apr. 1995, p. 32, 5 pages.

Fidelity Helps Fund Sellers Trim the Taxes They'll Owe, The Wall Street Journal, Nov. 7, 2002.

First Data markets stored-value cards, Cards International, Jan. 30, 1996, p. 5.

Norris, First data unit develops blockbuster cash card, Omaha World Hearld Sunrise Edition, Business Section, Jan. 19, 1996, p. 16.

Harsh Truth: Your Investments Likely Won't Make Any Money.

(56) References Cited

OTHER PUBLICATIONS

Money, Initial Launch to 200 Credit Unions, USA Today.com, Jun. 27, 2002.
Decovny, Net Scope, Banking Technology, May 1997.
Nokia Announces the World's First NFC Enabled Mobile Product for Contactless Payment and Ticketing, PRNewswire, Feb. 9, 2005.
Armstrong, Douglas, Norwest eases difficulty of Interstate banking Bank's customers may use the same account number at any branch.
Goode, On Profit, Loss and the Mysteries of the Mind, The New York Times, Nov. 5, 2002.
Anonymous, Operating in a multi-currency environment, ProQuest document ID 9215937, ISSN/ISBN 09589309, Oct. 1995.
Maher and Troutman, Payor's Prescription for Painless Migration to Electronic Healthcare Payments and Remittance Advices, PNC Bank, Dec. 2001.
Maturi, Richard, Personal Finance; When you Need to Send Cash in a Flash.
Press Release, Mar. 5, 2004, Payment Data Systems Files Patent on Debit Card Payment Solution, American City Business Journals, Inc., Mar. 5, 2004.
Maher and Troutman, Provider's Prescription for Painless Migration to Receipt of Electronic Healthcare Payments and Remittance Advices, PNC Bank, Dec. 2001.
Anonymous, Systems spell change for foreign exchange, Global Investor, ProQuest document ID 1056152B, ISSN/ISBN: 09513604, Nov. 1996.
French, Tech Stocks: Market Movers, Investors Worry CheckFree Being Chased from Its Own Game, http://www.thestreet.com, Jun. 20, 2002.
Technology, In Brief Wachovia-InteliData Deal, May 7, 2002.
Zuckerman, The Hedge-Fund Craze, The Wall Street Journal, Jun. 12, 2002.
McDonald, The Stars in the Sky Flicker, and Fund Stars Do the Same, The Wall Street Journal, Jan. 15, 2003.
Anonymous, Visa & Carnegie Mellon Plan Online Payment Scheme, Newsbyte News Network, Feb. 15, 1995.
Financial News, Wells Fargo Rolls Out Nationwide Lockbox Check Conversion, PR Newswire Association, Apr. 22, 2003.
Terrie Miller and Henry Yan, When Custody Governs, Benefits Canada, Toronto, Feb. 1998, vol. 22, Issue 2, p. 33, 5 pages.

* cited by examiner

METHOD AND SYSTEM FOR PROVIDING ELECTRONIC BILL PAYMENT AND PRESENTMENT

CROSS REFERENCE TO RELATED APPLICATIONS

The present application claims priority to Provisional Application Ser. No. 60/460,054, filed on Apr. 4, 2003 which is hereby incorporated by reference herein in its entirety.

FIELD OF THE INVENTION

The present invention relates generally to processing payments, and more particularly, to a method and system for providing electronic bill payment and presentment services to a customer.

BACKGROUND OF THE INVENTION

Consumer adoption of electronic bill payment and presentment (also referred to as "EBPP") has been much slower than anticipated. Many banks are eager to encourage their customers to use bill payment. Electronic payments would also provide banks with savings in cost and resources. Although variations in costs may alter the calculation, many banks and customers find that EBPP services are attractive provided that several bills (e.g., seven recurring bills) can be paid.

In general, initiating bill payment services, such as an EBPP, may be daunting for consumers. Many banks do not make the process easy, and at best provide only a list of billers. For billers already listed, payers must add information regarding their individual account numbers and other information necessary to make payments. For all other billers, complete information about the biller must be input manually by the customer or bill payer. This can be a tedious and time consuming process with a high potential for errors and mistakes.

On the merchant side, replacing checks with electronic payments for automatic reconciliation would provide cost reductions. Transactions may be completed more efficiently and in a more timely manner.

Checkfree™ is the dominant bill payment service provider, largely because at great cost they developed a very large biller database. However, even though Checkfree™ has attempted to increase the number of billers that will accept electronic payment, each month a substantial percentage of Checkfree™ bills are still sent physically through the mail. As a result, the efficiencies associated with automatic bill payment are not realized.

As with many new payment systems, EBPP faces the classic 'chicken or the egg' conundrum. Both payers and billers generally require a clear value proposition before they will change their behavior. Accelerating the change to EBPP will require benefits to be increased or the burdens to be reduced. Billers need an adequate number of payers willing to pay electronically to justify making changes. From the perspective of payers, the aggravation of setting up a bill payment account must be reduced and the number of bills payable electronically increased.

If a bank operates a biller's lockbox and holds the payer's demand deposit account (also referred to as a "DDA"), a simple on-the-bank transaction is possible.

Further, a payer's bank may not know which of the biller's accounts should be credited and will rarely know the specific customer account number. Thus, the payer's bank does not have enough information from a check to facilitate future electronic transfers.

The biller's lockbox bank may have the information needed to replace future checks with electronic transfers (e.g., the payer's checking account number, payer's account number with biller and biller's payment account). However, the lockbox bank does not have the payer customer relationship.

Other drawbacks may also be present.

SUMMARY OF THE INVENTION

Accordingly, one aspect of the invention is to address one or more of the drawbacks set forth above.

According to an exemplary embodiment of the present invention, a method for facilitating electronic payment related services to at least one payer entity for making payments to at least one biller comprises the steps of collecting payer information associated with the at least one payer entity; collecting billing information associated with the at least one payer entity; identifying one or more billers associated with the at least one payer entity from the payer information and the billing information, where the at least one payer entity has a relationship with each of the one or more billers; generating a menu for the at least one payer entity to select one or more billers for activating one or more electronic payment related services; and activating the one or more electronic payment related services in response to the at least one payer entity's selection of the one or more billers.

In accordance with other aspects of this exemplary embodiment of the present invention, the payer information comprises payer identification data and payer account number; the payer information is gathered from a payment item; the payer information is gathered from a payer bank associated with the at least one payer; the billing information comprises biller identification data, biller's payment account and payer account number at the biller; the biller information is gathered from one of remittance advice and coupon associated with a payment item, both sent from the at least one payer; the biller information is gathered from at least one lockbox entity associated with the at least one biller; the billing information is collected from a consortium of billers wherein the billers comprise merchants; the billing information is collected from a consortium of banks associated with one or more of billers and payers; the one or more electronic payment related services comprise one or more of electronic payment and electronic presentment; the menu is a graphical user interface accessible via the Internet; the menu is electronically transmitted to the at least one payer entity; the method further comprises the step of generating one or more incentives for the at least one payer entity for participation in the one or more electronic payment related services; a lockbox entity receives the payer information and billing information for gathering data to perform electronic payment related services; and the payer modifies the one or more electronic payment related services.

According to another exemplary embodiment of the present invention, a system for facilitating electronic payment related services to at least one payer entity for making payments to at least one biller comprises collect payer data module for collecting payer information associated with the at least one payer entity; collect biller data module for collecting billing information associated with the at least one payer entity; biller list module for identifying one or more billers associated with the at least one payer entity from the payer information and the billing information, where the at least one payer entity has a relationship with each of the one or more billers; menu module for generating a menu for the at least one payer entity to select one or more billers for activating one or more electronic payment related services; and activate module for activating the one or more electronic payment related services in response to the at least one payer entity's selection of the one or more billers.

According to yet another exemplary embodiment of the present invention, at least one signal embodied in at least one carrier wave for transmitting a computer program of instructions configured to be readable by at least one processor for facilitating electronic payment related services to at least one payer entity for making payments to at least one biller comprises payer data collecting means for collecting payer information associated with the at least one payer entity; biller data collecting means for collecting billing information associated with the at least one payer entity; identifying means for identifying one or more billers associated with the at least one payer entity from the payer information and the billing information, where the at least one payer entity has a relationship with each of the one or more billers; generating means for generating a menu for the at least one payer entity to select one or more billers for activating one or more electronic payment related services; and activating means for activating the one or more electronic payment related services in response to the at least one payer entity's selection of the one or more billers.

DETAILED DESCRIPTION OF THE INVENTION

Embodiments of the present invention are directed to various aspects of electronic bill payment and presentment. According to one exemplary embodiment, a retailer or lockbox operator may capture payer information as well as biller information where a menu is generated for a customer to activate the billers for electronic payment and/or electronic presentment by selecting one or more billers.

Figure 1:
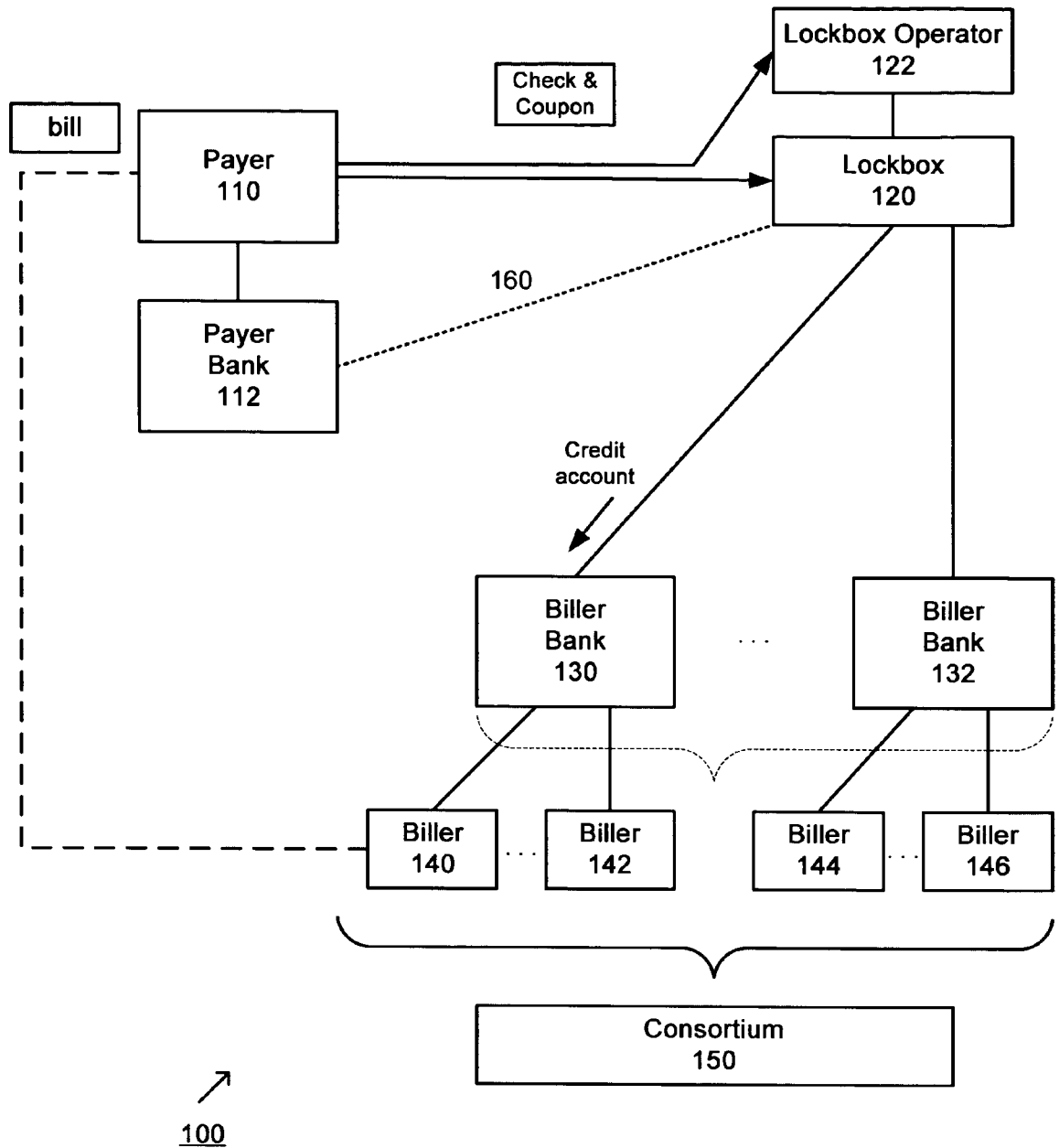
FIG. 1 is an exemplary diagram illustrating a system for gathering information for facilitating electronic bill payment and/or presentment services according to an embodiment of the present invention.

FIG. 1 is an exemplary diagram illustrating a system for gathering information for facilitating electronic bill payment and/or presentment services according to an embodiment of the present invention. While most the elements are shown as a single element, it is understood that multiple elements, participants and/or entities may be implemented. In the exemplary embodiment of system 100, Payer 110 may receive a bill from a merchant or biller entity, represented by Biller 140. Biller may represent a merchant or other provider of services and/or goods for sale to a customer, who may be represented by Payer 110. Examples of purchases may include, but are not limited to, telephone services, cable services, credit card statements, health club fees, mortgage payments, mobile telephone services, rental payments, insurance premiums and other one-time and/or recurring payments.

Payer 110 may represent a customer, recipient and/or payer of services and/or goods from a merchant or biller, and/or other paying entity. Payer 110 may include an individual, small business, corporation, government entity, public service entity, non-profit organization, or other entity. It is understood that the payer may or may not be the customer who receives the goods and/or services. Payer 110 may be associated with a Payer Bank 112. Payer Bank 112 may represent a financial institution from which funds may be deposited and/or withdrawn. Financial institutions may include any entity that performs financial services, such as check processing, deposits, wire transfers, etc. For example, Payer 110 may have an account at Payer Bank 112 from which funds may be transferred to an intended recipient.

Upon receipt of a bill (or bill presentment), Payer 110 may forward a payment item (e.g., a check) and associated paperwork which may include a coupon, remittance advice or other paperwork. Generally, the Payer 110 may receive a preaddressed envelope with the address of the intended recipient of the payment. Payment may be sent to a financial institution (or other receiving entity) associated with the merchant or biller.

In this exemplary embodiment, the payment item and associated paperwork may be received at Lockbox 120 or Lockbox Operator 122. While a single Lockbox is shown, multiple Lockboxes or a consortium of Lockboxes may be implemented. Some banks or financial institutions may operate physical lockbox operations on behalf of their biller clients. Lockbox 120 may represent a bank-owned or bank-operated lockbox, a retail lockbox, a lockbox operated by one or more billers, or other equivalent entity or service. In addition, Lockbox 120 may be operated by Lockbox Operator 122. Lockbox Operator 122 may include a biller, biller bank, lockbox bank, a non-bank operator or other entity.

Lockbox 120 may receive customer payments and process the payments. For example, from the payment item (e.g., a check), payer name, address and other contact information may be identified as well as the payment amount and payer bank (or financial institution). Other information may be obtained from the check or other payment item. From the associated paperwork (e.g., coupon, remittance advice, etc.), the biller, payer name, payer address (and/or other contact information), payment amount, biller's assigned account number for the payer and/or other information may be obtained. Lockbox 120 may associate each check (or payment item) and associated paperwork received from a payer with a particular biller account. Through this processing, Lockbox 120 may collect payer data, biller data and/or other data associated with electronic payment, presentment and/or other services. With this information, Lockbox 120 may identify various billers for which electronic payment, presentment and/or other services may be provided. Lockbox 120 may maintain information for replacing checks with electronic transfers, such as the payer's checking account number, the payer's account number with the biller and the biller's payment account. In addition, Lockbox 120 may send information to Biller Bank 130 and/or individual billers. For example, remittance advice (or other information) may be sent to Biller 142 directly or through Biller Bank 130. Other data may be forwarded via various schemes.

Electronic payment may involve transferring funds from a payer account at Payer Bank 112 to an appropriate account at Biller Bank 130. Electronic payment may include electronic transfer of funds, image replacement document (IRD), Automated Clearing House (ACH), Accounts Receivable Conversion (ARC) and other forms of electronic payment. Electronic presentment may involve presenting a bill or other request for payment via an electronic or other communication to Payer 110 from Biller 140 or Biller Bank 130 (or other agent or representative). For example, an electronic bill may be emailed to Payer 110. In another example, an email (or other) notification may instruct Payer 110 to access a secure website to view a bill as well as other information. Electronic presentment may include Electronic Check Presentment (ECP) and other variations.

Customer payments may be delivered to an appropriate biller bank where the biller bank may then process the payments for deposit directly into an appropriate bank account. Biller clients may include Biller Bank 130, 132. Biller Bank 130 may be associated with a plurality of billers, as shown by Billers 140, 142. Similarly, Biller Bank 132 may be associated with Billers 144, 146.

Generally, Payer Bank 112 alone does not know which of the biller's account should be credited and does not know the specific customer account number with the biller. Thus, the payer bank by itself does not have enough information from a check to facilitate future electronic transfers. According to an exemplary application, Lockbox 120 may have an arrangement with Payer Bank 112, as shown by 160, for converting each transaction to an electronic payment. For example, the arrangement may involve Lockbox 120 paying a fee to Payer Bank 112 for each converted payment. According to another example, Payer Bank 112 may pay a fee to Lockbox 120 for each electronic conversion or other agreed services. Other arrangements with fees and/or other incentives may be implemented between Payer Bank 112 and Lockbox 120. Further, various information and/or data may be exchanged between Payer Bank 112 and Lockbox 120. By contract with Payer Bank 112, Lockbox 120 may agree to facilitate payers making electronic transfers to billers. For example, Payer Bank 112 may provide Lockbox 120 with payment files, providing information concerning the payer's checking account, the biller's name and/or other information. Lockbox 120 may automatically credit the correct payer account at the biller. According to another example, Lockbox 120 may convey a list of payers that pay Lockbox 120 to Payer Bank 112. Payer Bank 112 may then offer electronic services to the payers, such as Payer 110. Transparency makes it easy for various participants to audit the fees owed by Lockbox 120 to Payer Bank 112.

In addition, Payer Bank 112 may offer incentives to Payer 110 to encourage acceptance of electronic bill presentment and/or other electronic services. Various incentive arrangements involving credits, bonuses, discounts and/or other inducements may be implemented. For example, Payer Bank 112 may offer an incentive (e.g., monetary incentive) to Payer 110 to participate in electronic services for a certain time period (e.g., 6 months). Once Payer 110 participates in the services for the time period, it is likely that the payer will continue to use the electronic services indefinitely. According to another example, a biller (e.g., merchant) may purchase (or otherwise acquire) email addresses of payers from Payer Bank 112 to facilitate electronic presentment services. Other arrangements for acquiring email addresses of payers may be implemented. As billers have great economic incentives to convert paper bills to electronic presentment, various incentives may be provided to payers from billers themselves.

In this exemplary embodiment, lockboxes have an important role in facilitating conversion from expensive physical bill/check processing to electronic transmissions. Lockboxes may negotiate attractive compensation arrangements with billers (and/or other participants) to accelerate this process. It may also provide motivation for banks to consider buying additional physical lockbox operations or services. For example, a particular bank may offer billers an attractive fixed price, multi-year contract for lockbox transactions.

With agreements between payer banks and lockboxes shown by 160, the payer set-up for electronic bill payment may be vastly simplified. By referencing a payer's check history, payer banks may create a list of a payer's past payees. This list may be matched against billers serviced by lockbox banks with which a payer bank has an agreement. Payer bank may then present the payer with a list of entities for which the bank can facilitate electronic payments. Payers may then decide on a check by check, automatic draw or other basis to pay bills electronically. The entire process is efficient and very convenient for payers. Further, the process does not depend on electronic bill presentment. As the lockbox associates a payer's payments with specific biller accounts, a payer may pay any biller electronically.

According to another exemplary application, banks may leverage their historic network advantages. For example, banks may agree to collaborate on a reciprocal basis to identify, from bill-pay customer checks, information that will facilitate future electronic payments between the payer and the payee, e.g., did the payee's lockbox bank register the payee's billing account identifier for the payer, which account of the payee credited the check(s), etc. Such information may facilitate electronic payment to payees, with or without cooperation from the billers.

According to another example, banks may offer customers a list of payees of historical checks from payee account information available from the cancelled check (or other payment item). The customer may then electronically make payments to any payee. This may provide much of the functionality of peer-to-peer payments, except for non-recurring payments, such as one-time auction payments. According to an exemplary application, the value is to use existing accounts and payment methods wherever possible. In this manner, the banks may isolate certain payment systems to the narrow purposes (e.g., ad hoc payments to strangers) for which they can provide the easiest solution.

A constantly or periodically updated list of payees (which behind the scenes may be connected with either or both, the bank account destination and the payer's account, if the payee is a biller) may be generated, any one of which may be sent cash or other payment automatically. According to an embodiment of the present invention, a new payee may receive a physical check the first time, but thereafter the payee may receive electronic funds paid to the account shown on the cancelled check (or other payment item).

From an economic perspective, there are benefits and incentives for various participants involved. For example, payer banks may facilitate enrolling their customers in electronic bill payment and/or presentment services thereby reducing the cost of paying checks on their behalf. Payer banks have great incentive to switch to electronic payment and presentment services due, at least in part, to the high cost of clearing physical checks. Payer banks also have a trusted relationship with the payer. As many banks participate in online banking, payer banks may also have payer email addresses and other contact information. By engaging payers in electronic services, such as electronic payment, payer banks are able to reduce expenses and increase efficiencies. Further, billers (e.g., merchants) also have great incentives to convert payers/customers to electronic services to avoid mailing physical bills each month (or other time period), for example. Thus, billers may have an agreement with payer banks to pay for each mailed check avoided. Other arrangements may be implemented to encourage conversion to electronic services.

Lockbox banks may reduce manual processes by switching from physical to electronic processes, leveraging their position in the physical world into an evolution to increase their electronic lockbox business. Biller lockbox charges may be reduced and electronic payment may facilitate consumer acceptance of electronic bill presentment. Therefore, banks may generate new revenues by leveraging information they currently have, arising out of existing customer relationships.

According to an embodiment of the present invention, certain entities within system 100 may have access to payer address, biller name and the biller account number (e.g., the payer account at the biller). In this example, the lockbox or lockbox operator may have the necessary information to facilitate electronic services. For example, the lockbox or lockbox operator may have access to certain data from the check (or other payment item) against the payer's account. For example, the MICR line may be retrieved from a check, which may be used to facilitate electronic services. For ACH participation, payer authorization may be required which may be facilitated by the payer bank. An embodiment of the present invention efficiently combines the information needed to facilitated electronic services and provides economic and other benefits to various participants involved in the process.

Another embodiment of the present invention may be directed to facilitating electronic peer-to-peer payments, as well as customer-to-customer, merchant-to-merchant, supplier-to-merchant, customer-to-government, merchant-to-government, government-to-customer and various other payment scenarios. Provided that a payer has already paid using a check (or other payment item), the payee's bank may facilitate future electronic payments to the same, affiliated and/or related party.

An embodiment of the present invention recognizes the advantages of an on-us transaction. An on-us transaction may involve any banking transaction in which the acquirer and the issuer are the same institution. For example, the payer bank and the biller bank may be the same (or affiliated) bank. Therefore, on-us transactions are low-cost electronic transfers within the same (or affiliated) bank. An embodiment of the present invention provides technology that recognizes that a lockbox payment is received from a payer having a correspondent relation. Thus, by expanding the number of correspondent relations, an increase in on-us transactions may be realized thereby lowering further costs and achieving higher efficiencies. According to another example, on-us transactions may be increased by implementing a lockbox operator that operates a plurality of lockboxes thereby increasing the occurrence of on-us transactions. According to yet another example, lockbox operators may be linked to an additional one or more lockbox operators where electronic files and other formation may be shared to further recognize on-us transactions.

According to another embodiment of the present invention, a consortium of merchants (or billers) may be implemented to consolidate consumer data and/or other data, as shown by Consortium 150. For EBPP to be broadly adopted, a critical mass should be achieved. With regard to lockbox services, merchants are more alike than different. Many merchants may benefit from services, such as check replacement, that minimize merchant discount and conversion to electronic bill presentment. Banks may be easily co-opted by a merchant consortium, since replacement of checks with electronic payments will reduce bank expense.

Various advantages are available to billers of a merchant consortium. For example, merchants would have greater control of their own destiny. Establishing EBPP standards may reduce cost and complexity while assuring aggressive pricing competition among product/service providers. A centralized EBPP utility may minimize merchant technology investment, by spreading the costs across a large base of users. Broad merchant acceptance of a consortium may be realized by focusing on goals that benefit merchants. An exemplary proposition for consumers may involve a single centralized EBPP where a merchant consortium may allocate costs, based on various benefits to individual billers and facilitate current capital/start-up expenses that can be amortized over future transaction volumes.

A merchant consortium of an embodiment of the present invention may consolidate customer data across an entire group. The consortium may send each consumer an individualized list of billers and permit each consumer to enable electronic presentment/payments by simply selecting billers from the list. For example, the consumer may receive a menu of potential billers and select billers by checking off boxes or other user action. By providing a mechanism to share the cost, the merchant consortium may offer consumers attractive financial inducements to make the change to electronic payment, presentment and/or other services. For example, rewards and bonuses may be graduated to incentivize behavior beneficial to merchants, e.g., incremental sums for each biller paid electronically, bonuses for payments by ACH, large premiums for replacing physical bills with electronic bill presentment and/or other inducements.

According to another embodiment of the present invention, a consortium of banks may be implemented for bank centered Lockbox/EBPP consolidation, also shown by Consortium 150. Further, a combination of banks and merchants may be implemented as well. For example, bank strategies may include a combination of seeking to sign merchants to comprehensive lockbox service contracts (e.g., 5 year contacts, etc.), which may include a proviso that the biller make available its client address list and lockbox information, in order to facilitate the bank's attempts to convert its customers to EBPP. Bank strategies may include implementing contracts providing banks with customer address and lockbox information, and merchant agreement to pay a bounty if, and to the extent, the bank is able to convert customers to electronic payment and/or presentment and contracts for banks to host a consolidated site for bill presentment by many merchants. For example, these contracts may provide that billers would not compete with the bank's efforts to convert biller customers to EBPP. If the bank is quickly able to sign up a group of billers, their weight may preclude subsequent attempts to build critical mass for a merchant consortium. In addition, banks may facilitate on behalf of other lockbox service providers use of information available to them.

Figure 2:
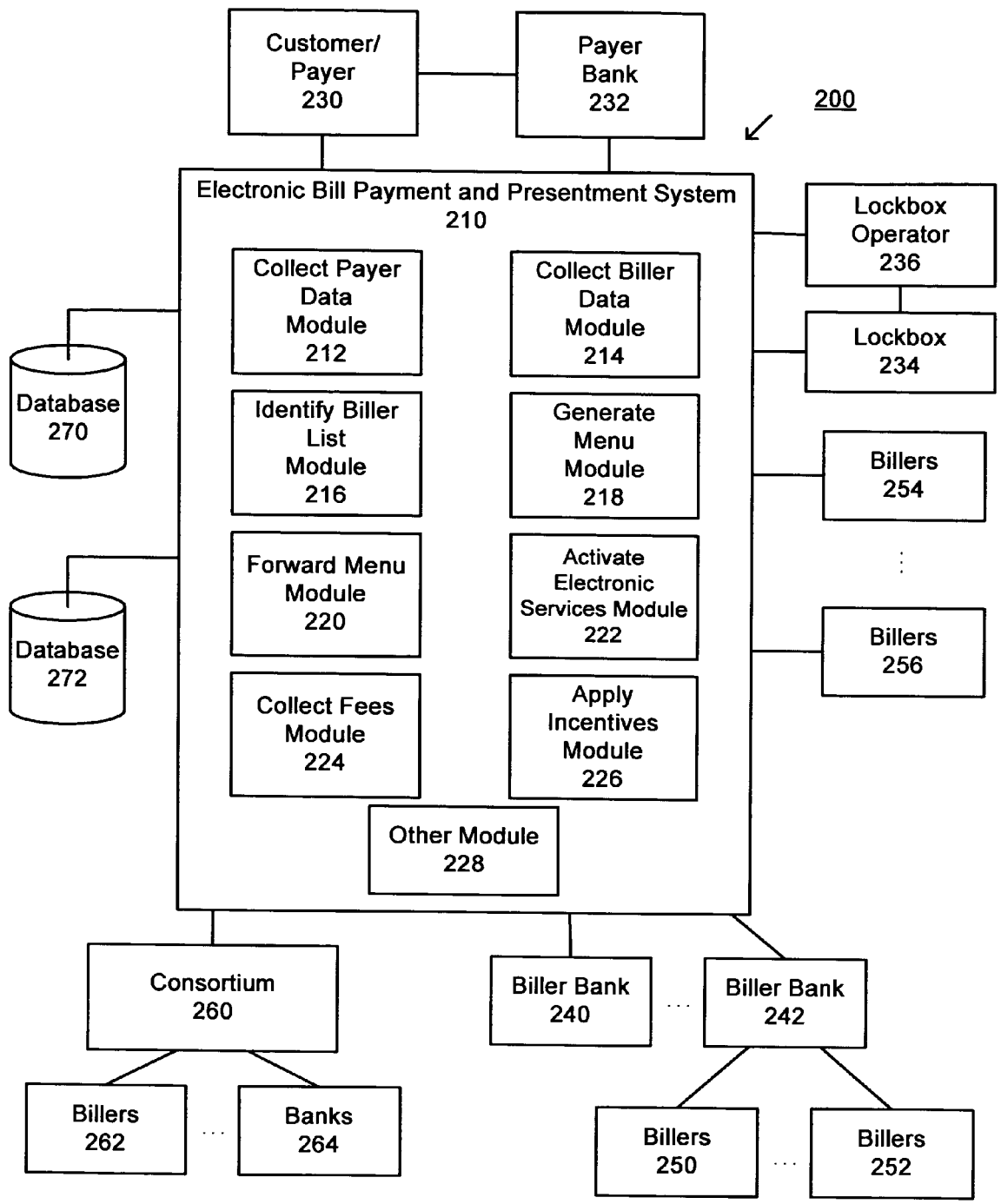
FIG. 2 is an exemplary diagram of an electronic bill payment and presentment system according to an embodiment of the present invention.

FIG. 2 is an exemplary diagram 200 of an electronic bill payment and presentment system according to an embodiment of the present invention. Electronic Bill Payment and Presentment (EBPP) System 210 may include various modules for facilitating electronic payment and presentment services for various participants. EBPP system 210 may include Collect Payer Data Module 212, Collect Biller Data Module 214, Identify Biller List Module 216, Generate Menu Module 218, Forward Menu Module 220, Activate Electronic Services 222, Collect Fees Module 224, Apply Incentives Module 226 and/or other module 228. Additional functionality may also be supported by EBPP system 210. Further, the modules may be combined in various combinations and further separated, if so desired. While a single system is shown, multiple systems may be implemented. The modules may be spread throughout multiple systems as well. Various other formats and implementations may be realized. EBPP system 210 may be provided by or affiliated with various participants, including Lockbox 234, Payer bank 232, Biller Banks 240, 242, Consortium 260 and/or others.

Data received by the modules of EBPP system 210 may be stored, manipulated, indexed in various storage devices, including Databases 270, 272. Databases may be combined or further separated, as preferred by various applications.

Collect Payer Data Module 212 may receive information about payers from various sources, including lockboxes, banks, payment items (e.g., check, coupon, remittance advice, etc.) and/or other sources of information. Payer data may include payer identification data, check account number, and/or other data. Collect Biller Data Module 214 may receive biller information, such as biller's payment account data, payer account number with the biller and/or other information. Billers 254, 256 may interface directly with EBPP system 210. In another example, Billers 250, 252 may interface with EBPP 210 through Biller Banks 240, 242. As discussed above, a Consortium 260 of Billers 262, Banks 264 and/or combination of both billers and banks may also communicate with EBPP 210.

Identify Biller List module 216 may identify a list of eligible billers from the payer data and/or biller data. For example, based on previously paid bills, a list of billers may be generated. The list of eligible billers may then be matched against eligible billers, such as billers that participate in electronic bill payment and presentment services and/or billers associated with Lockbox 234. In addition, adjustments to the biller list may be made. For example, a payer may switch mobile phone companies where the previous mobile phone company will be removed and the new mobile phone company will be added. Other adjustments and/or changes may be made.

Generate Menu Module 218 may generate a menu for each payer (or group of payers), as illustrated by Customer 230 for allowing the selection of electronic bill payment and/or presentment (and/or other electronic services) for the billers identified by module 216. The list of billers and associated information for electronic payment and presentment may be automatically generated through an embodiment of the present invention where manual input of data for each biller is avoided. In this example, a user can simply select the desired billers for electronic payment and/or presentment activation. The menu may be forwarded to Customer/Payer 230 via Forward Module 220. Forward Module 220 may forward the menu to the Customer/Payer 230 via various forms of communication, including email, Internet, voice, mobile phone, text message, PDA, other wireless mobile devices and/or other forms of communication. In another example, the customer may access EBPP 210 through an interface to view the menu for the specific customer.

Activate Electronic Services 222 may activate electronic payment, presentment and/or other services for the billers selected by Customer/Payer 230. For electronic payment, funds may be transferred electronically from Payer Bank 232 to a Biller Bank (e.g., 242). For electronic presentment, a biller (e.g., 250) may electronically transmit a bill (or billing information) to the Customer/Payer 230. Electronic services may be activated by the customer/payer. In another example, the electronic services may be activated by a biller, bank, lockbox or other authorized entity, after receiving authorization from the customer/payer. For example, with the bill, a customer/payer may receive an offer for electronic payment, presentment and/or other services. The customer/payer may indicate activation of electronic services by selecting a box (e.g., checking a box for electronic services activation) or other user action. The indication of activation of electronic services may be forwarded with the check (or other payment). For example, the indication of electronic services may be a separate form, part of the remittance advice, coupon or other paperwork. The activating entity, which may include biller, bank, lockbox, or other entity, may then receive the indication of electronic services and activate the appropriate services for the identified merchant(s) on behalf of the payer.

If a payer selects electronic bill payment, a financial institution associated with the merchant/biller to be paid may be notified about the amount to be paid and the financial institution associated with the payer from which payment will be received. At the appropriate time, the merchant's financial institution may send a request for the funds to the payer's financial institution. The payer's financial institution may process the request and electronically send the payment to the merchant's financial institution. Verification of receipt of the payment may then be sent from the merchant's financial institution to the payer's financial institution as warranted. The accounts may be updated as necessary to account for the transfer of funds.

If a payer selects electronic bill presentment, merchant/billers may electronically present bills to payers. Electronic bill presentment may include an electronic communication, such as sending an email transmission containing the bill. In addition, electronic bill presentment may include sending an email notification to a payer that a bill has been presented on a website accessible to the payer or presenting a bill on a website that is accessible to the payer, where the payer knows that the bill will be posted periodic basis (e.g., monthly, etc.). Other forms of electronic presentment may be used. It is understood that bills presented on a website accessible by one or more payers may include one or more levels of security based on the information presented. Thus, it may be desirable to allow unlimited access of a website for non-sensitive information (e.g., a web posting informing all health club payers that they will be billed $50.00 on August 15). Alternatively, it may be desirable to create a more secure environment requiring a password and login to access a web site containing sensitive information (e.g., viewing credit card purchase information, etc.).

According to another example, certain fees may be collected by Collect Fees Module 224. Depending on a contract or other agreement, fees may be collected for each conversion (or other number of conversions) to electronic transmission from certain participants. For example, fees may be received from Payer Bank 232 to Lockbox 234 (or Lockbox Operator 236) for electronic conversions and/or other services. In addition, fees may be received from Lockbox 234 (or Lockbox Operator 236) to Payer Bank 232 for electronic conversions and/or other services. Payer Bank 232 may charge fees for sharing customer/payer contact information, such as email addresses, to facilitate electronic presentment or other services. Other services may also be charged for various participants.

Incentives may be generated and provided to customers (and/or other participants) via Apply Incentives Module 226. For example, customers may be offered an incentive to participate in electronic payment and/or presentment services. Incentives may include monetary incentives ($X per each transaction, a percentage or other amount), discounts, credits and/or other forms of incentive. For example, Payer Bank 232 may offer Customer/Payer 230 incentives to participate in electronic services. The incentives may include a monetary incentive for electronic services participation for a time period, such as 6 months or other time period, to encourage continued participation even after the end of the time period. In another example, a biller may present a customer with an option for both electronic bill payment and electronic bill presentment, as well as an inducement of $25.00 for selecting one of the options. The customer may be asked to provide customer addresses and lockbox information. Incentives between other participants may be implemented. Incentives may be customized for particular types of customers. For example, an avid health club member may receive credit for gym equipment, discounts at a sporting goods store and/or other related activities or products. Therefore, certain targeted information may be used for more customized incentives.

Figure 3A:
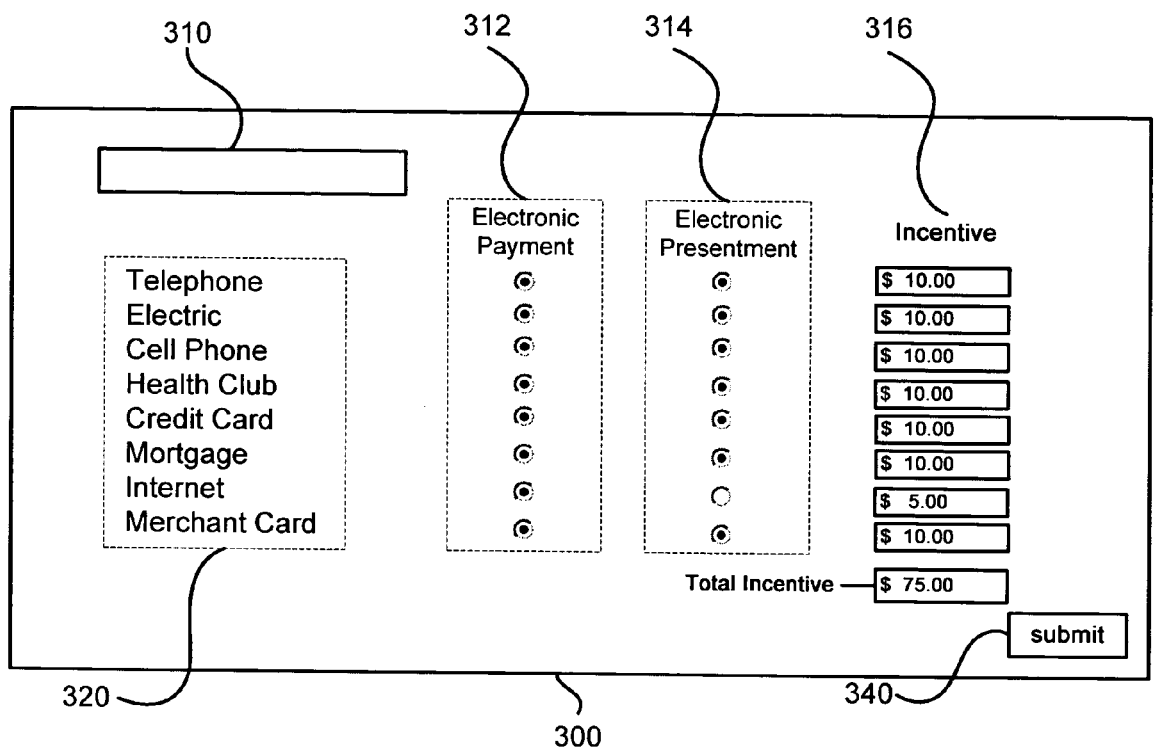
FIG. 3A illustrates an example of a graphical user interface for presenting a menu to a payer for electronic services selection according to an embodiment of the present invention.

FIG. 3A illustrates an example of a graphical user interface 300 for presenting a menu to a payer for electronic services selection according to an embodiment of the present invention. The graphical user interface 300 includes a function bar 310 having functions used in graphical user interfaces, such as, but not limited to, a back function key, a forward function key, a stop function key, and a print function key. The graphical user interface may be available to a user on a website, via the Internet or other electronic communication. The user may also receive the graphical user interface by an electronic communication, such as an email or other transmission. In addition, the information provided on the graphical user interface may be provided via mail or other form of communication. User selections may be made by various modes of communication, including Internet, email, phone, mail, etc.

In the example illustrated in FIG. 3A, the graphic user interface 300 provides a menu having a merchant portion 320, an electronic bill payment selection portion 312 and an electronic bill presentment selection portion 314. Merchant portion 320 contains a listing of merchants that have presented bills to the payer in the past. In the example of FIG. 3A, the merchants may include a telephone services provider, an electric company, a cell phone services provider, a health club, a credit card, a mortgage provider, an internet services provider, and a merchant card company. It will be understood that the list presented in graphical user interface 300 is exemplary only and that other merchants may also be included in a list, while one or more of the merchants on the exemplary list may be omitted, depending upon the particular customer and the availability of the merchant/biller information.

As described above, the menu presented on graphical user interface 300 may include electronic bill payment selection portion 312 and electronic bill presentment selection portion 314. Other electronic services may also be provided. In the present exemplary embodiment, electronic bill payment selection portion 312 is in the form of buttons (or other activation mechanism) that a customer may activate by way of a mouse or other selection mechanism (e.g., keyboard, touch screen, infrared pointer, etc.). The customer may activate those buttons corresponding to the particular merchant for which electronic bill payment is desired. In the present exemplary embodiment, electronic bill presentment selection portion 314 is also in the form of buttons that a payer may activate by way of a mouse or other selection mechanism (e.g., keyboard, touch screen, infrared pointer, etc.). The customer may also activate the buttons corresponding to the particular merchant for which electronic bill presentment is desired. The payer may select any combination of electronic bill presentment and payment for one or more merchants. For example, the payer may select electronic bill presentment and payment for the health club, electronic bill presentment only for the credit card, electronic bill payment only for the Internet provider and neither electronic bill presentment nor electronic bill payment for the mortgage provider. Other combinations may also occur.

Incentives for participation may be provided to the payer, as shown by Incentive 316. In this example, an incentive of $10.00 is provided for participation in electronic payment and electronic presentment services, as selected by the payer where $5.00 may be offered for each electronic payment selection and another $5.00 for electronic presentment selection. Other monetary amounts, which may be different for electronic payment and presentment, may be provided. A total incentive amount may be provided. In addition, the incentives may be effective for a certain time period of participation, e.g., 6 months. The payer may select submit button 230 to activate the selected electronic services for the merchants.

Figure 3B:
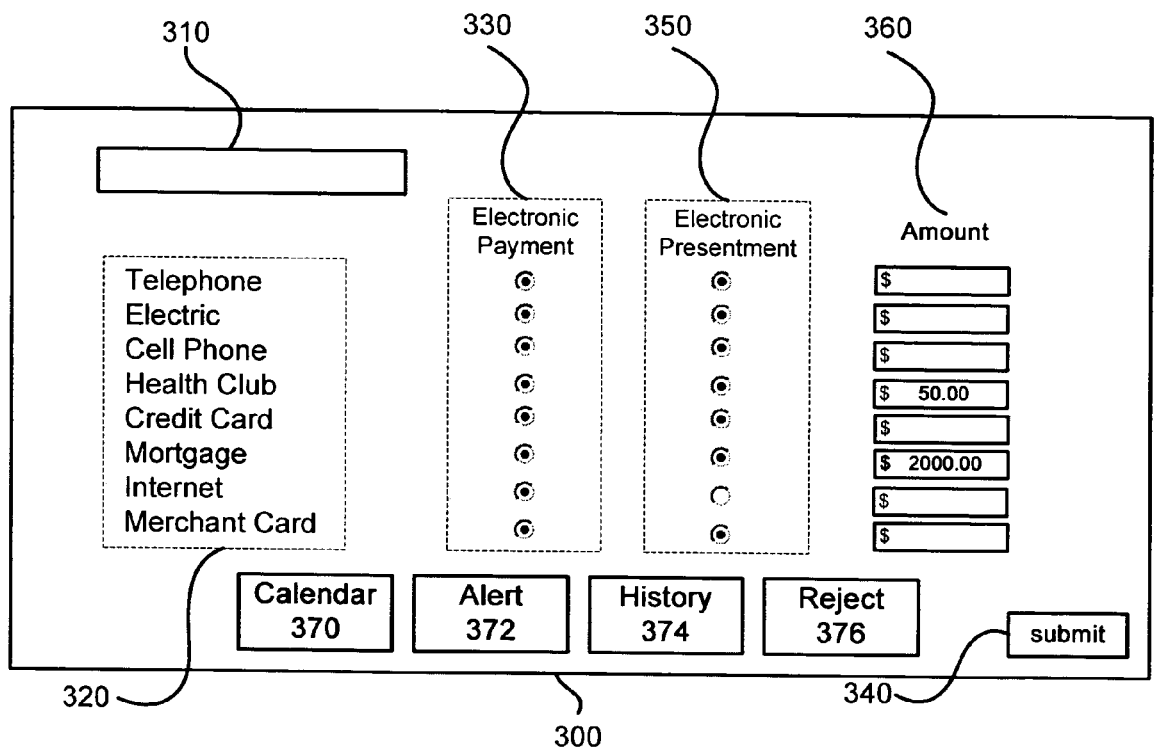
FIG. 3B illustrates an example of a graphical user interface for presenting a menu to a payer for payment services according to an embodiment of the present invention.

FIG. 3B illustrates an example of a graphical user interface 300 for presenting a menu to a payer for payment services according to an embodiment of the present invention. The graphical user interface 300 includes a function bar 310 having functions used in graphical user interfaces, such as, but not limited to, a back function key, a forward function key, a stop function key, and a print function key. The graphical user interface may be available to a user on a website, via the Internet or other electronic communication. The user may also receive the graphical user interface by an electronic communication, such as an email or other transmission. In addition, the information provided on the graphical user interface may be provided via mail or other form of communication. User selections may be made by various modes of communication, including Internet, email, phone, mail, etc.

In the example illustrated in FIG. 3B, the graphic user interface 300 provides a menu having a merchant portion 320, an electronic bill payment selection portion 330 and an electronic bill presentment selection portion 340 displaying the payer's selections made at the menu of FIG. 3A.

As shown by 360, the payer may enter an amount (which may be the total amount, partial amount, minimum amount, etc.) for each merchant/biller for automatic bill payment. For some services, a flat monthly (or other periodic) fee may apply. For such services, the amount may be automatically filled in for the payer. As shown in this example, health club charges may be $50.00 each month and mortgage payment may be $2000 each month. Other payments may be filled in by the payer.

Other payment and/or presentment functions may also be provided. For example, a scheduling option including a calendar, an alert system including payer specified notifications and/or other functions may be available to the payer. For example, calendar 370 enables a payer to schedule specific times of payment, including day of month and even time of day. For example, if a merchant card has a monthly payment deadline of the $15^{th}$ of each month, the payer may schedule payment to be made on the $13^{th}$ of each month. According to another example, payment may be made right before each due date to ensure maximum fund availability to the payer. Alert 372 enables a payer to specify alerts based on predetermined conditions. For example, an alert may be sent to the payer's preferred mode of communication (e.g., email) for payment reminders of one or more payments. In another example, a notification identifying a condition, such as insufficient funds or other low threshold, may be relayed to the payer. Other forms of notification may be applied, such as phone reminders, cell phone messages, emails and/or other forms of communication. Different conditions may warrant different forms of communication.

Other functions may include History 374 and Reject 376. History 374 may provide historical data related to payment, presentment or other data. For example, the payer may view historical electronic payment and/or presentment data for each merchant for a designated time period. Previous payment amounts may be viewed and analyzed for accuracy or other purpose. Reject 376 may provide the payer with an option to reject (or dispute) a bill presentment (or other unilateral action) from a merchant. For example, if a payer is erroneously charged, the payer may reject the bill presentment for a specific merchant, amount or transaction. For example, a payer may make a one-time purchase for an item and receive recurring bills for the same or related product—the subsequent bills may be rejected (or challenged) by Reject 376. In another example, a payer may make a one-time payment for another recipient (e.g., child, sibling, parent, etc.) but continue to receive bills on behalf of the recipient. Other functions and tools may be implemented to facilitate electronic payment and presentment services. Once the payer has made the desired selections, the submit button 340 may be activated.

Figure 4:
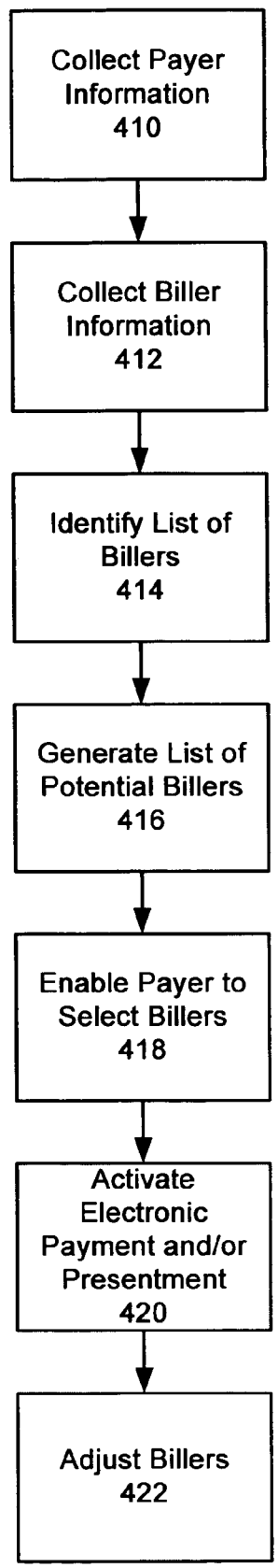
FIG. 4 is a flowchart illustrating a process for providing electronic bill payment and/or presentment according to an embodiment of the present invention.

FIG. 4 is a flowchart illustrating a process for providing electronic bill payment and/or presentment according to an embodiment of the invention. At step 410, payer information may be collected. At step 412, biller information may be collected. At step 414, a list of eligible billers for electronic payment and/or presentment services may be identified and further matched against a list of participating billers. A list of potential billers for payer activation may be generated at step 416. At step 418, customers may be allowed to select billers for payment and/or presentment services. For example, a menu may be generated and presented to a payer. Appropriate electronic payment and/or presentment services may be activated as identified by the customer, at step 420. Based on customer activities and/or other circumstances, the list of potential billers may be adjusted, at step 422. Although the process illustrated in FIG. 4 has been described in one particular combination of steps, it is understood that other steps may be included within the process, steps may be omitted from the process, steps may be performed in a different order, or some combination thereof. The process illustrated in FIG. 4 will now be described in greater detail.

At step 410, payer information may be collected. Payer information may be gathered from various sources. For example, payer information may be gathered from a check (or other payment item), which may include payer name, billing address of the payer, and/or other contact information (e.g., telephone numbers, email addresses, etc.) Payer information may also include the payer's account number or other account identification. In addition, payment amount may be verified from the payment item. Financial institution information may also be gathered. By way of example, financial institution information may include, but is not limited to, information regarding the relationship between the payer and the financial institution, such as the payer's name, the name of the financial institution, the account number(s) associated with the payer, the financial routing number associated with the financial institution, the address of the financial institution, and contact information for the financial institution (e.g., telephone number, email address, website address, etc.). According to an embodiment of the invention, financial institution information may be gathered by the financial institution itself.

At step 412, merchant/biller information may be gathered. By way of example, merchant/biller information may include, but is not limited to, information regarding the relationship between a payer and the merchant/biller, such as the identity of the merchant that is supplying the goods and/or service, the account number(s) the merchant/biller has associated with the payer, biller payment account and/or other information. According to an embodiment of the invention, merchant/biller information may be gathered by the merchant/biller itself.

With the payment item, associated paperwork may be received, which may include a coupon, remittance advice or other paperwork. The associated paperwork may include information, such as biller (or other payee identifier), payer name, payer address, other payer contact information, biller assigned account number for the payer, payment amount and/or other information.

At step 414, a list of potential billers may be identified for electronic payment and/or presentment services. The list of billers may be identified from payer information, biller information and/or other data. The list of potential billers may be matched against participating billers associated with the lockbox.

At step 416, the list of potential billers may be identified and presented to the user as a menu, at step 418. According to an embodiment of the invention, based on payer information and merchant/biller information, the menu may include a list of billers (or merchants) with which the customer has a relationship. This menu may be presented to the customer in a number of ways, such as, but not limited to, electronic presentation (e.g., website, email transmission, etc.), hard copy presentation (e.g., mailing the menu printed on a piece of paper), and voice presentation (e.g., telephone message) and/or other forms of communicating information. An exemplary menu is shown by FIG. 3, as discussed above.

At step 418, payers may select one or more billers for electronic payment, presentment and/or other services. According to one example, customer selections may be received based on the manner in which the menu is presented to the customer. Thus, if the menu is presented on a graphical user interface, such as that illustrated in FIG. 3, the payer selections may be received via an electronic transmission. Other manners of receiving selections (e.g., voice instructions, mail, etc.) may also be used. The received selections may be associated into the payer account. The selections may be associated with the information stored within a database.

At step 420, electronic payment and/or presentment may be activated for future electronic services, as identified by the customer's selections. At step 422, adjustments to the list of billers for electronic payment and/or presentment may be made periodically or as new billers are identified and added. Modifications may also include timing of payment, amount of payment, format of presentment, and other various characteristics associated with electronic payment, presentment and/or other services. Other payment and/or presentment modifications may also be implemented, per the customer's instructions.

According to an embodiment of the invention, bills may be analyzed to identify periodic bill presentments, e.g., weekly, monthly, bi-monthly, quarterly, yearly, etc., for conversion to an electronic bill payment and presentment process. Because of the periodic nature of these types of bills, payers may be more likely to desire electronic bill presentment and payment than with bills that are more sporadic in nature. However, it is understood that all types of bills may be included in the present invention.

According to an embodiment of the invention, the systems and processes described in this invention may be implemented on any general purpose computational device, either as a standalone application or applications, or even across several general purpose computational devices connected over a network and as a group operating in a client-server mode. According to another embodiment of the invention, a computer-usable and writeable medium having a plurality of computer readable program code stored therein may be provided for practicing the process of the present invention. The process and system of the present invention may be implemented within a variety of operating systems, such as a Windows® operating system, various versions of a Unix-based operating system (e.g., a Hewlett Packard, a Red Hat, or a Linux version of a Unix-based operating system), or various versions of an AS/400-based operating system. For example, the computer-usable and writeable medium may be comprised of a CD ROM, a floppy disk, a hard disk, or any other computer-usable medium. One or more of the components of the system or systems embodying the present invention may comprise computer readable program code in the form of functional instructions stored in the computer-usable medium such that when the computer-usable medium is installed on the system or systems, those components cause the system to perform the functions described. The computer readable program code for the present invention may also be bundled with other computer readable program software. Also, only some of the components may be provided in computer-readable code.

Additionally, various entities and combinations of entities may employ a computer to implement the components performing the above-described functions. According to an embodiment of the invention, the computer may be a standard computer comprising an input device, an output device, a processor device, and a data storage device. According to other embodiments of the invention, various components may be computers in different departments within the same corporation or entity. Other computer configurations may also be used. According to another embodiment of the invention, various components may be separate entities such as corporations or limited liability companies. Other embodiments, in compliance with applicable laws and regulations, may also be used.

According to one exemplary embodiment of the present invention, the system may comprise components of a software system. The system may operate on a network and may be connected to other systems sharing a common database. Other hardware arrangements may also be provided.

Other embodiments of the present invention are also envisioned.

The invention claimed is:

1. An automated method for facilitating electronic payment related services to at least one payer entity for making payments to at least one biller, wherein the method is executed by a programmed computer processor, the method comprising the steps of:
    collecting payer information associated with the at least one payer entity from a lockbox entity;
    collecting billing information associated with the at least one payer entity from the lockbox entity, wherein the lockbox entity is operated by a lockbox operator that further operates a plurality of lockbox entities to effectuate on-us transactions through correspondent relations;
    automatically identifying a list of one or more eligible billers associated with the at least one payer entity from the payer information and the billing information collected from the lockbox entity using the programmed computer processor, without manual entry of the one or more billers by the at least one payer entity to the programmed computer processor, where the at least one payer entity has a relationship with each of the one or more billers;
    matching the list of one or more eligible billers with one or more billers serviced by a lockbox bank with which a payer bank, associated with the at least one payer entity, has an agreement;
    generating a menu for the at least one payer entity to select one or more of the one or more billers, automatically identified from the payer information and billing information collected from the lockbox entity using the programmed computer processor, for activating one or more electronic payment related services; and
    activating the one or more electronic payment related services in response to the at least one payer entity's selection of the one or more billers, wherein the one or more billers form a consortium to consolidate payer data.

2. The method of claim 1, wherein the payer information comprises payer identification data and payer account number.

3. The method of claim 2, wherein the payer information is gathered from a payment item.

4. The method of claim 2, wherein the payer information is gathered from a payer bank associated with the at least one payer.

5. The method of claim 1, wherein the billing information comprises biller identification data, biller's payment account and payer account number at the biller.

6. The method of claim 5, wherein the biller information is gathered from one of remittance advice and coupon associated with a payment item, both sent from the at least one payer.

7. The method of claim 5, wherein the biller information is gathered from at least one lockbox entity associated with the at least one biller.

8. The method of claim 1, wherein the billing information is collected from a consortium of billers wherein the billers comprise merchants.

9. The method of claim 1, wherein the billing information is collected from a consortium of banks associated with one or more of billers and payers.

10. The method of claim 1, wherein the one or more electronic payment related services comprise one or more of electronic payment and electronic presentment.

11. The method of claim 1, wherein the menu is a graphical user interface accessible via the Internet.

12. The method of claim 1, wherein the menu is electronically transmitted to the at least one payer entity.

13. The method of claim 1, further comprising the step of:
    generating one or more incentives for the at least one payer entity for participation in the one or more electronic payment related services.

14. The method of claim 1, wherein a lockbox entity receives the payer information and billing information for gathering data to perform electronic payment related services.

15. The method of claim 1, wherein the payer modifies the one or more electronic payment related services.

16. A system for facilitating electronic payment related services to at least one payer entity for making payments to at least one biller, the system comprising
    a programmed computer processor which communicates with a user via a network;
    payer data module configured to collect payer information associated with the at least one payer entity from a lockbox entity;
    biller data module configured to collect billing information associated with the at least one payer entity from the lockbox entity, wherein the lockbox entity is operated by a lockbox operator that further operates a plurality of lockbox entities to effectuate on-us transactions through correspondent relations;

biller list module configured to automatically identify a list of one or more eligible billers associated with the at least one payer entity from the payer information and the billing information collected from the lockbox entity using the programmed computer processor, without manual entry of the one or more billers by the at least one payer entity to the programmed computer processor, where the at least one payer entity has a relationship with each of the one or more billers and further configured to match the first list of one or more eligible billers with one or more billers serviced by a lockbox bank with which a payer bank, associated with the at least one payer entity, has an agreement;

menu module configured to generate a menu via the network for the at least one payer entity to select one or more of the one or more billers, automatically identified from the payer information and billing information collected from the lockbox entity using the programmed computer processor, for activating one or more electronic payment related services; and activate module configured to activate the one or more electronic payment related services in response to the at least one payer entity's selection of the one or more billers, wherein the one or more billers form a consortium to consolidate payer data.

17. The system of claim 16, wherein the payer information comprises payer identification data and payer account number.

18. The system of claim 17, wherein the payer information is gathered from a payment item.

19. The system of claim 17, wherein the payer information is gathered from a payer bank associated with the at least one payer.

20. The system of claim 16, wherein the billing information comprises biller identification data, biller's payment account and payer account number at the biller.

21. The system of claim 20, wherein the biller information is gathered from one of remittance advice and coupon associated with a payment item, both sent from the at least one payer.

22. The system of claim 20, wherein the biller information is gathered from at least one lockbox entity associated with the at least one biller.

23. The system of claim 16, wherein the billing information is collected from a consortium of billers wherein the billers comprise merchants.

24. The system of claim 16, wherein the billing information is collected from a consortium of banks associated with one or more of billers and payers.

25. The system of claim 16, wherein the one or more electronic payment related services comprise one or more of electronic payment and electronic presentment.

26. The system of claim 16, wherein the menu is a graphical user interface accessible via the Internet.

27. The system of claim 16, wherein the menu is electronically transmitted to the at least one payer entity.

28. The system of claim 16, further comprising:
incentive module for generating one or more incentives for the at least one payer entity for participation in the one or more electronic payment related services.

29. The system of claim 16, wherein a lockbox entity receives the payer information and billing information for gathering data to perform electronic payment related services.

30. The system of claim 16, wherein the payer modifies the one or more electronic payment related services.

31. An automated method for facilitating electronic payment related services to at least one payer entity for making payments to at least one biller, wherein the method is executed by a programmed computer processor, the method comprising the steps of:

collecting payer information associated with the at least one payer entity, wherein the payer information comprises payer identification data and payer account number;

collecting billing information associated with the at least one payer entity, wherein the billing information comprises biller identification data, biller's payment account and payer account number at the biller and wherein a lockbox entity receives the payer information and billing information for gathering data to perform electronic payment related services, wherein the lockbox entity is operated by a lockbox operator that further operates a plurality of lockbox entities to effectuate on-us transactions through correspondent relations;

automatically identifying a list of one or more eligible billers associated with the at least one payer entity from the payer information and the billing information collected from the lockbox entity using the programmed computer processor, without manual entry of the one or more billers by the at least one payer entity to the programmed computer processor, where the at least one payer entity has a relationship with each of the one or more billers;

matching the list of one or more eligible billers with one or more billers serviced by a lockbox bank with which a payer bank, associated with the at least one payer entity, has an agreement;

generating a menu for the at least one payer entity to select one or more of the one or more billers, automatically identified from the payer information and billing information collected from the lockbox entity using the programmed computer processor, for activating one or more electronic payment related services;

activating the one or more electronic payment related services in response to the at least one payer entity's selection of the one or more billers, wherein the one or more electronic payment related services comprise one or more of electronic payment and electronic presentment, wherein the one or more billers form a consortium to consolidate payer data; and enabling the payer to modify the one or more electronic payment related services.

32. The method of claim 31, wherein the billing information is collected from a consortium of billers wherein the billers comprise merchants.

33. The method of claim 31, wherein the billing information is collected from a consortium of banks associated with one or more of billers and payers.

34. The method of claim 31, further comprising the step of:
generating one or more incentives for the at least one payer entity for participation in the one or more electronic payment related service.

* * * * *

UNITED STATES PATENT AND TRADEMARK OFFICE
CERTIFICATE OF CORRECTION

| | |
|---|---|
| PATENT NO. | : 8,630,947 B1 |
| APPLICATION NO. | : 10/814626 |
| DATED | : January 14, 2014 |
| INVENTOR(S) | : Freund |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1398 days.

Signed and Sealed this
Twentieth Day of October, 2015

Michelle K. Lee
*Director of the United States Patent and Trademark Office*